May 28, 1946. H. H. CURRY ET AL 2,400,979
DIESEL ELECTRIC MARINE DRIVE
Filed Oct. 16, 1940 2 Sheets-Sheet 1
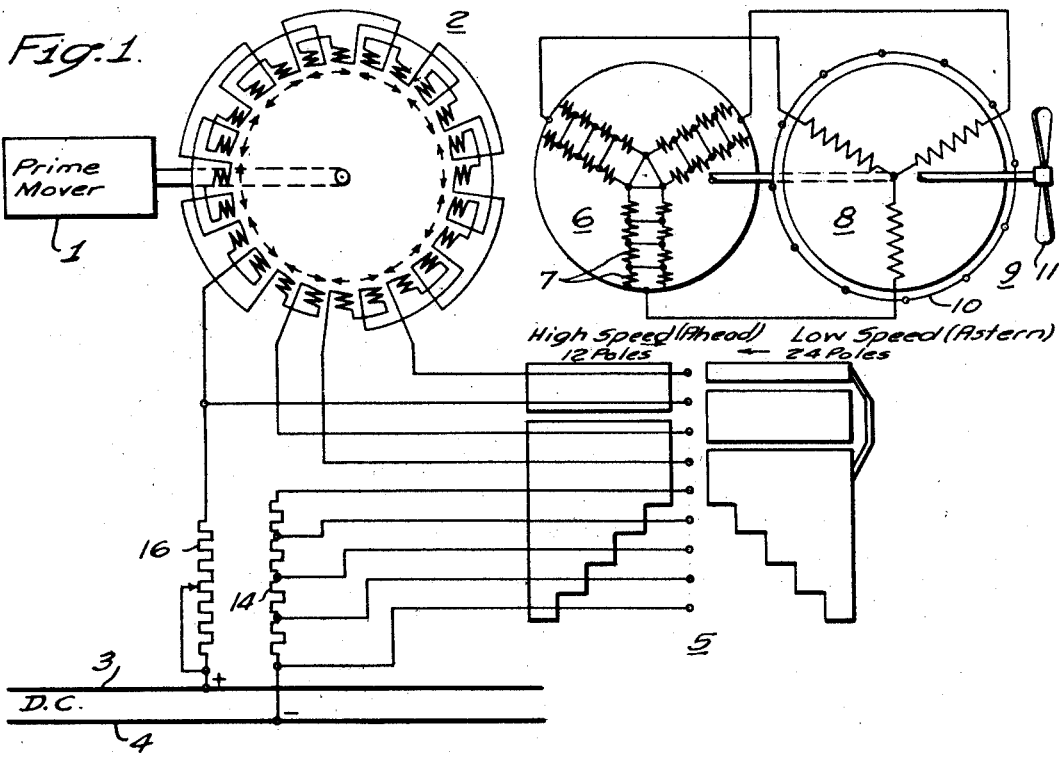
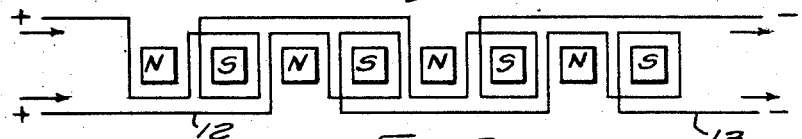
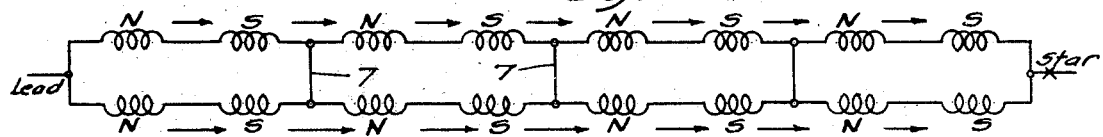
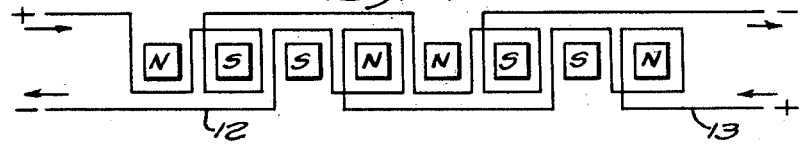
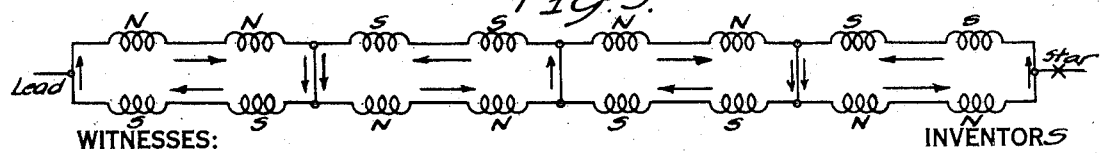
WITNESSES: INVENTORS
Herman H. Curry and
Adolphus M. Dudley.
BY
Paul E. Friedemann
ATTORNEY May 28, 1946.　　　　H. H. CURRY ET AL　　　　2,400,979
DIESEL ELECTRIC MARINE DRIVE
Filed Oct. 16, 1940　　　2 Sheets-Sheet 2

WITNESSES:
E. A. McCloskey.
Wm. J. Ruano

INVENTORS
Herman H. Curry and
Adolphus M. Dudley.
BY
Paul E. Friedemann
ATTORNEY Patented May 28, 1946

2,400,979

UNITED STATES PATENT OFFICE 2,400,979

DIESEL ELECTRIC MARINE DRIVE

Herman H. Curry, Montgomery County, Md., and Adolphus M. Dudley, Oakmont, Pa., assignors to Westinghouse Electric Corporation, East Pittsburgh, Pa., a corporation of Pennsylvania Application October 16, 1940, Serial No. 361,342

12 Claims. (Cl. 172—3)

Our invention relates to a reversible electric drive of general application, which drive is particularly suitable as a marine propulsion drive where reversal of the propeller without the necessity of reversal of the prime mover is desired.

An object of our invention is to provide a reversible marine propulsion drive which is relatively light in weight, inexpensive, and simple in operation.

Another object of our invention is to provide a marine propulsion drive including a Diesel engine, an electrical coupling (also called "electric-coupling" and "electro-magnetic coupling") and an induction motor in which the rotors of the electric coupling and induction motor are interconnected without collector rings.

Another object of our invention is to provide an electromagnetic coupling having a salient pole, direct current energized field winding on its driving member and having a phase wound winding on its driven member which is so wound that the phase winding selectively becomes a short-circuited winding or an alternating current generator, depending upon the selection of pole numbers in the salient pole driving member by a pole changing switch, so as to provide direct drive through the electromagnetic coupling in the "ahead" direction in the case of the short-circuited winding or to provide drive at a lower speed in the "astern" direction in the case of the winding acting as a generator when electrically connected to the rotor of an induction motor.

Other objects and advantages will become more apparent from a study of the following specification when considered in conjunction with the accompanying drawings, in which:

Figure 1 is a schematic showing of a marine propulsion drive embodying the principles of our invention;

Fig. 2 is a schematic showing of the salient pole winding on the driving member of the electromagnetic coupling of the member for low speed "astern" operation, that is, for a larger pole number;

Fig. 3 is a diagrammatic showing of the polarity of one of the phase windings on the driven member of the electromagnetic coupling when the driving member is connected, as shown in Fig. 2;

Fig. 4 is a view similar to Fig. 2 but in which two of the leads are reversed in polarity so as to give a lower pole number which is suitable for high speed "ahead" operation;

Fig. 5 is a view similar to Fig. 3 but which corresponds to the connections of the salient pole driving member shown in Fig. 4;

Figure 6:
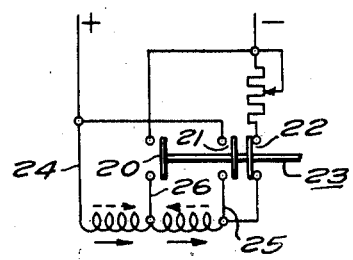
Figs. 6 and 7 are schematic showings of a second method of pole changing.

Figs. 8 to 11 inclusive are views corresponding to Figs. 2 to 5 inclusive but showing a pole changing ratio of 3 to 1 instead of 2 to 1.

In propulsion drives, many outstanding advantages have been found in the employment of the "Kilgore" type of electromagnetic coupling comprising generally, a salient pole direct current energized driving member and a short-circuited winding or pair of short-circuited double layer windings on the driven member (or vice versa). This type of winding has been disclosed in the co-pending application of L. A. Kilgore and R. A. Baudry, now Patent No. 2,259,311, issued October 14, 1941, and entitled "Electric couplings." One of the outstanding advantages of such coupling is the elimination of transmission of torsional vibrations through the system. One defect of this type of drive is that the Diesel engine is not readily reversible to effect rotation in the "astern" direction. We have conceived the idea of employing the coupling as a phase wound machine or generator to transmit power to a reversing motor when required, and thus effect ready reversibility of the propeller. By winding the driven member with a specially wound phase winding including equalizing connections, it is possible to employ this phase winding as a generator which will supply electrical energy to an induction motor to drive the propeller in the "astern" direction at relatively low speed for a definite selection of pole numbers on the salient pole driving element and by the mere changing of the number of salient poles by suitable switching means, the phase windings will automatically become short-circuited through their equalizing connections so that the electromagnetic coupling will act, in effect, as a Kilgore electric or slip coupling. Torque drive in the "ahead" direction is secured by electromagnetic action between the salient pole driving member and the short-circuited driven member which is substantially a direct drive normally having but a small degree of angular lag.

Referring more particularly to the drawings, numeral 1 designates a prime mover such as a Diesel engine which is mechanically coupled to a salient pole field winding 2 which is energized by a suitable source of direct current potential furnished through terminals 3 and 4. A controller 5 is provided for the purpose of changing the number of poles of the salient pole field winding 2. When moved to the right, the controller, by virtue of its left-hand segments will connect the field winding 2 for 12 poles, whereas, when moved to the left, the right-hand segments will provide a connection for 24 poles.

Fig. 2 shows schematically the manner in which the salient pole field winding 2 is wound so as to get alternate north and south poles in the case of the 24 pole connection which corresponds to low speed (astern) operation. Electromagnetically coupled to field winding 2 is a phase wound driven element 6 having a plurality of equalizing leads such as 7. When controller 5 is moved to the left so as to secure the higher number of poles (namely 24 poles) corresponding to the connection shown in Fig. 2, the phase wound winding driven element 6 assumes a polarity indicated in Fig. 3. In this instance, the phase winding 6 will act as a generator and will supply electrical energy to the phase wound rotor winding 8 of an induction motor 9, which induction motor has also a squirrel cage stator 10. Windings 6 and 8 are supported on cores which are rigidly interconnected by a common shaft. The induction motor 9 is so wound that for the higher pole number, as shown in Figs. 2 and 3 (and as indicated by the arrows in Fig. 1), the induction motor drive will be in the "astern" direction with its motive force supplied by the polyphase voltage and power delivered by the phase wound driven member 6. It will be noted that, in this instance, the propeller 11 is driven in a direction opposite to the direction of rotation of the prime mover shaft and its mechanically coupled field winding 2.

On the other hand, if it is desired to drive the ship in the "ahead" direction, controller 5 is moved to the left so as to secure the salient pole winding connection such as indicated in Fig. 4, namely, for a lower number of poles (12 poles). It will be seen that mere reversing of the polarity of the two lower terminals 12 and 13 of Fig. 2 will give the polarities indicated in Fig. 4. The phase winding on the driven element 6 assumes the polarity shown in Fig. 5 wherein, as will be seen by the direction of the arrows indicating current flow, the various groups of windings are short-circuited so that no electric power is generated by the phase wound driven member 6. The coupling is now in effect the "Kilgore type of coupling," inasmuch as the driven member has merely a short-circuited winding. Hence, there is substantially a direct drive between the salient pole field winding 2 and the phase wound driven member 6 due to electromagnetic action. Actually, the electric coupling carries the propeller in the "ahead" direction up to about 99% of the engine speed. The slight difference is due to the necessary electrical slip which introduces torque currents in the internally short-circuited winding or driven element 6. There is no current, voltage or power transmitted to the induction motor 9 on account of the internally short-circuiting of the phase winding on the driven element 6. Resistor 14 in Fig. 1 is divided into portions so as to provide a step-by-step, progressive short-circuiting of serially connected resistance 14, in either "ahead" or "astern" operation, as provided by the symmetrically arranged step-like segment portions on the lower part of the controller 5 as will be readily obvious to those skilled in the art. The resistor 16 is an additional resistance which may be provided if so desired.

Figure 7:
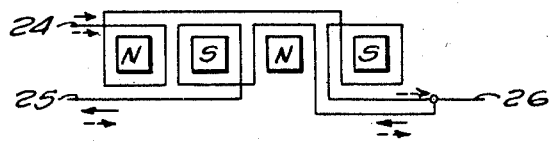
Figure 8:
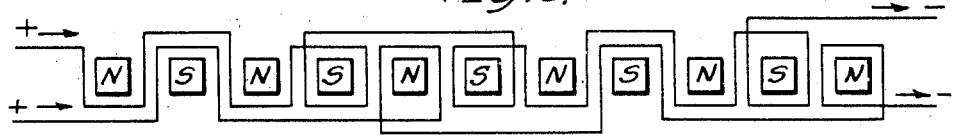
Figure 9:
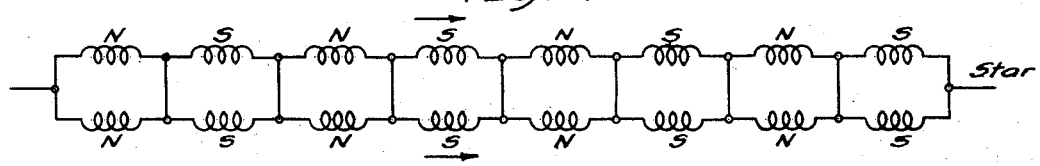
Figure 10:
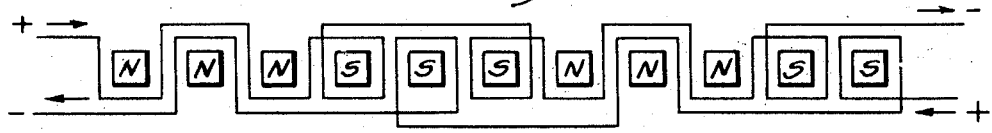

Another method of reversing alternate field poles, also obtaining double voltage on the fields for high torque for short time "astern" operation, is illustrated schematically in Figs. 6 and 7. Referring to Fig. 6, contact members 22 are normally closed and contact members 20 and 21 are normally open for "ahead" operation (as shown) therefore current will flow in the direction indicated by the arrows in full lines. For "astern" operation contactor 23 is operated therefore closing contact members 20 and 21 and opening contact members 22 therefore causing a current flow as indicated by the arrows in dotted lines. Three slip rings on the field element will be required. Numerals 24, 25 and 26 indicate identical conductors in Figs. 6 and 7.

Figure 11:
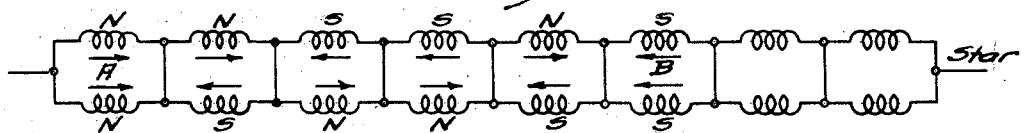

While in the foregoing discussion, there is shown a two to one speed ratio in the switch of a salient pole winding 2, such speed ratio is merely exemplary and is not the only speed ratio which is suitable for the purposes of our invention. For example, a three to one ratio or other ratios are also suitable. Figs. 8 to 11 are views similar to Figs. 2 to 5 inclusive but illustrating connections for a 3 to 1 ratio. Fig. 11, however, is somewhat different from Fig. 5 in that it has "dead spots" at points A and B. The winding as a whole nevertheless functions in the same manner as that illustrated in Fig. 5. In the case of a three to one ratio, as illustrated in Figs. 8 to 11 inclusive, there are alternate groups of three north poles and three south poles (see Fig. 10) instead of an alternate group of two north poles and two south poles as indicated in Fig. 4, in order to give the short-circuited equalizer connection similar to that attained in Fig. 5. From the teachings of our invention other winding connections will be readily suggested to those skilled in the art.

Furthermore the induction motor may have a plurality of windings or a single winding with suitable pole shifting means if additional speeds are desired.

We are, of course, aware that others, particularly after having had the benefit of the teachings of our invention, may devise other devices embodying our invention, and we, therefore, do not wish to be limited to the specific showings made in the drawings and the descriptive disclosure hereinbefore made, but wish to be limited only by the scope of the appended claims and such prior art that may be pertinent.

We claim as our invention:

1. An electro-mechanical, reversible drive comprising, in combination, a drive shaft, an electromagnetic coupling having a driving element mechanically coupled to said drive shaft and which has mounted thereon a multi-speed field winding and having a driven rotor element which has mounted thereon a polyphase winding, an electric machine having a stationary or stator element and a rotor having mounted thereon a polyphase rotor winding which is rigidly disposed with respect to and in circuit relationship with said first-mentioned polyphase rotor winding, a driven shaft mechanically connected to said last-mentioned rigidly interconnected rotors, switching means for selectively connecting said multi-speed field winding for different speeds, said first-mentioned rotor winding being connected so as to become short-circuited for one of said speed connections so as to effect direct drive through said electromagnetic coupling and idling of said electric machine, and to act as an alternating current generator, for a different speed connection, so as to effect rotation of said rotors in a reverse direction from the direction of rotation of said drive shaft.

2. A ship propulsion system comprising, in combination, a prime mover, a drive shaft mechanically coupled thereto, an electromagnetic coupling having a driving element mechanically coupled to said drive shaft which driving element includes a multi-speed field winding, and a driven rotor which includes a polyphase winding, an electric motor having a stationary or stator element and a rotor mechanically coupled to said first-mentioned rotor, a propeller mechanically coupled to said rotors, said motor rotor having a winding which is electrically connected to said first-mentioned rotor winding, a source of direct current together with switching means for selectively connecting said multi-speed field winding for different numbers of poles, one of which connections is effective to change the polarity of certain sections of the rotor of the electromagnetic coupling so that its windings are short-circuited thereby affording direct drive of said electromagnetic coupling and idling of said motor to drive the propeller in the "ahead" direction, and another pole connection which is effective to remove said short circuit, making the rotor winding act as an alternating current generator which will energize said motor, said motor being wound so as to drive the propeller in the "astern" direction, with said last-mentioned speed connection, at a lower speed than in the "ahead" direction without reversal of said prime mover.

3. A ship propulsion system comprising, in combination, a prime mover, a drive shaft mechanically coupled thereto, an electromagnetic coupling having a driving element mechanically coupled to said drive shaft which driving element includes a multi-speed salient pole field winding, and an electromagnetically driven rotor which includes a polyphase distributed winding, an induction motor having a stationary or stator element and a rotor mechanically coupled to said first-mentioned rotor, a propeller mechanically coupled to said rotors, said motor rotor having a polyphase, single speed winding which is electrically connected to said first-mentioned rotor winding, a source of direct current together with switching means for selectively connecting said multi-speed field winding for two different numbers of poles, one of which pole connections is effective to change the polarity of certain sections of the rotor of the electromagnetic coupling so that its windings are short-circuited thereby affording direct drive through said electromagnetic coupling and idling of said motor to drive the propeller in the "ahead" direction, the other of said pole connections being effective to remove said short circuit, making the rotor winding act as an alternating current generator which will energize said motor, said motor being wound so as to drive the propeller in the "astern" direction with said last-mentioned speed connection at a lower speed than in the "ahead" direction without reversing said prime mover.

4. A ship propulsion system comprising, in combination, a prime mover, a drive shaft mechanically coupled thereto, an electromagnetic coupling having a driving element mechanically coupled to said drive shaft which driving element includes a multi-speed field winding, and a driven rotor which includes a polyphase winding, an electric motor having a stationary stator element and a rotor mechanically coupled to said first-mentioned rotor, a propeller mechanically coupled to said rotors, said motor rotor having a winding which is electrically connected to said first-mentioned rotor winding, a source of direct current together with switching means for selectively connecting said multi-speed field winding for a different number of poles, one of which connections is effective to change the polarity of certain sections of the rotor of the electromagnetic coupling so that its windings are short-circuited thereby affording direct drive through said electromagnetic coupling and idling of said motor to drive the propeller in the "ahead" direction, and a different speed connection being effective to remove said short circuit and make the rotor winding act as an alternating current generator which will energize said motor, said motor being wound so as to drive the propeller in the "astern" direction, with said last-mentioned speed connection, at a lower speed than in the "ahead" direction without reversal of said prime mover, each of the phases of said winding on said first-mentioned rotor including two parallelly connected groups of serially connected coils electromagnetically coupled to said multi-speed field winding.

5. A ship propulsion system comprising, in combination, a prime mover, a drive shaft mechanically coupled thereto, an electromagnetic coupling having a driving element mechanically coupled to said drive shaft which driving element includes a multi-speed salient pole field winding, and a driven rotor which includes a polyphase distributed winding, an induction motor having a stationary or stator element and a rotor mechanically coupled to said first-mentioned rotor, a propeller mechanically coupled to said rotors, said motor rotor having a polyphase, single speed winding which is electrically connected to said first-mentioned rotor winding, a source of direct current together with switching means for selectively connecting said multi-speed field winding for two different numbers of poles, one of which pole connections is effective to change the polarity of certain sections of the rotor of the electromagnetic coupling so that all of its windings are short-circuited thereby affording direct drive of said electromagnetic coupling and idling of said motor to drive the propeller in the "ahead" direction, and the other pole connection being effective to remove said short circuit, making the rotor winding act as an alternating current generator which will energize said motor, said motor being wound so as to drive the propeller in the "astern" direction, with said last-mentioned speed connection, at a lower speed than in the "ahead" direction without reversing said prime mover, each of the phases of said winding on said first-mentioned rotor including two parallelly connected groups of serially connected coils electromagnetically coupled to said multi-speed field winding.

6. In a ship propulsion system, in combination, a prime mover, a motor coupled to the propeller, a propeller, a dynamo-electric machine having a pair of relatively rotatable elements mechanically coupled to said prime mover and propeller, respectively, to transmit mechanical power from the prime mover to the propeller, said dynamo-electric machine having a plurality of field windings that may be connected for any one of several selected number of poles, control means associated with the field windings of the dynamo-electric machine for one operation selecting a number of poles to operate the said dynamo-electric machine as an electromagnetic coupling to drive the propeller in one direction of operation, and for another operation selecting a different number of poles to operate the said dynamoelectric machine as a generator energizing said motor for driving the propeller in the other direction of rotation.

7. In a ship propulsion system, in combination, a prime mover, a propeller, a dynamo-electric machine having a pair of relatively rotatable elements mechanically coupled to said prime mover and propeller, respectively, to transmit mechanical power from the prime mover to the propeller, said dynamoelectric machine having a plurality of field windings that may be connected for any one of several selected number of poles, means associated with the dynamo-electric machine for connecting said field windings for any one of said selected number of poles for operating the said dynamo-electric machine as an electro-magnetic coupling to drive the propeller in one direction of operation, and means associated with said dynamo-electric machine for connecting said field windings for another selected number of poles for rendering it effective to drive the propeller in the other direction of rotation.

8. In a ship propulsion system, in combination, a prime mover, a propeller, a first dynamo-electric machine having field windings, that may be connected for any one of several selected number of poles, driven by the said prime mover and a rotor having a winding mounted thereon, which rotor is mechanically connected to the said propeller, means for connecting the said field windings to a source of electrical energy, control means associated with the said first machine for connecting said field windings for any one of said selected number of poles for rendering the said first machine effective to drive the propeller in one direction of rotation, a second dynamo-electric machine having a rotor winding electrically connected to the said rotor winding of the first machine and mechanically connected to the propeller and having a short-circuited stationary winding, and control means associated with the first machine for connecting said field windings for another selected number of poles to be effective to drive the propeller in a reverse direction of rotation.

9. In a ship propulsion system, in combination, a prime mover, a propeller, a first dynamo-electric machine having field windings, that may be connected for any one of several selected number of poles, driven by the said prime mover and a rotor having a winding mounted thereon, which rotor is mechanically connected to the said propeller, means for connecting the said field windings to a source of electrical energy, control means associated with the said first machine for connecting said field windings for any one of several selected number of poles for rendering the said first machine effective to drive the propeller in one direction of rotation, a second dynamo-electric machine having a winding electrically connected to the rotor winding of the first machine, and control means associated with the said first machine for connecting said field windings for another selected number of poles thereby rendering the said second machine effective to drive the propeller in a reverse direction of rotation.

10. In a ship propulsion system, in combination, a prime mover, a propeller, a first dynamo-electric machine having field windings that may be connected for any one of several selected number of poles, and being driven by the prime mover and a rotor having a winding mounted thereon, which rotor is mechanically connected to the propeller, selective control means for selecting any one of said number of poles, a second dynamo-electric machine having a rotor winding electrically connected to the said rotor winding of the first dynamo-electric machine and mechanically connected to said first-mentioned rotor and the propeller, a stator winding for the said second dynamo-electric machine, the said selective control means being operable to render the said first dynamo-electric machine effective, upon the selection of one number of poles, to couple the propeller to the prime mover and ineffective to energize the second dynamo-electric machine, and the said selective control means being operable upon selection of another number of poles to render the first dynamo-electric machine effective to energize the said second dynamo-electric machine.

11. In a ship propulsion system, in combination, a prime mover, a propeller, a first dynamo-electric machine having a set of two groups of serially connected field windings driven by the prime mover and a rotor having a winding mounted thereon, which rotor is mechanically connected to the said propeller, a second dynamo-electric machine mechanically connected to the propeller and having a winding electrically connected to the rotor winding of the said first machine, selective control means for connecting the said two groups of field windings of the first machine in parallel to a source of electrical energy to render the said first machine effective to couple the prime mover to the propeller to drive the propeller in one direction of rotation or to reverse the polarity of one group of the field windings with respect to the other group to render the said first machine effective to energize the said second machine to drive the propeller in another direction of rotation.

12. In a ship propulsion system, in combination, a prime mover, a propeller, a first dynamo-electric machine having a set of two groups of serially connected field windings connected in parallel and mounted on a driving member driven by the prime mover, and a rotor winding mounted on a driven member mechanically connected to the said propeller, a second dynamo-electric machine mechanically connected to the propeller and having a winding electrically connected to the rotor winding of the said first machine, selective control means for connecting the said two groups of field windings of the said first machine in parallel to a source of electrical energy to render the said first machine ineffective to energize the said second machine and operable at will to reverse the polarity of one group of the field windings with respect to the other group to render the said first machine effective to energize the said second machine.

HERMAN H. CURRY.
ADOLPHUS M. DUDLEY.